(No Model.)
G. OTT.
HEATING DRUM.
No. 431,782. Patented July 8, 1890.
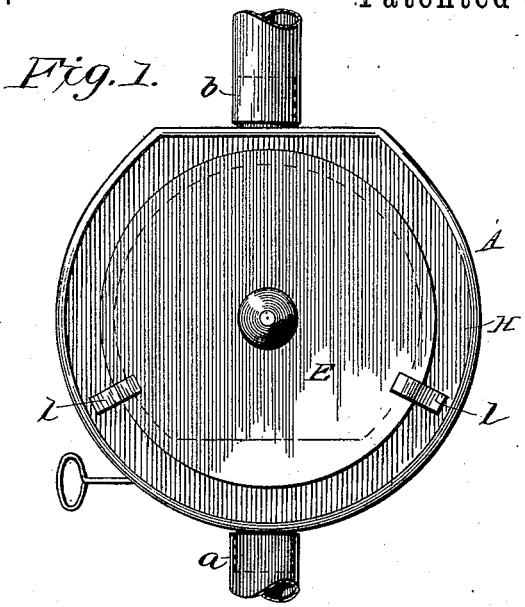
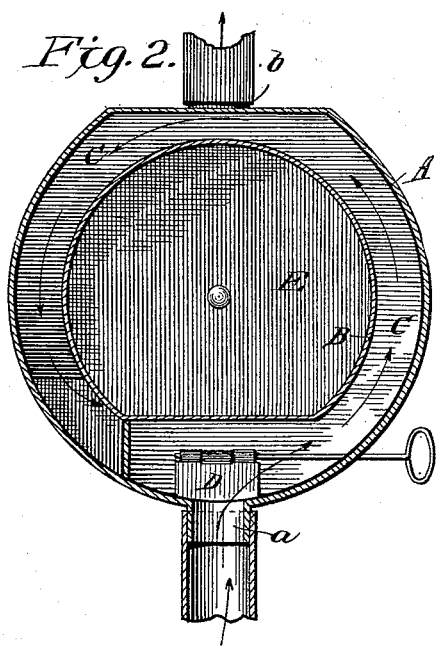
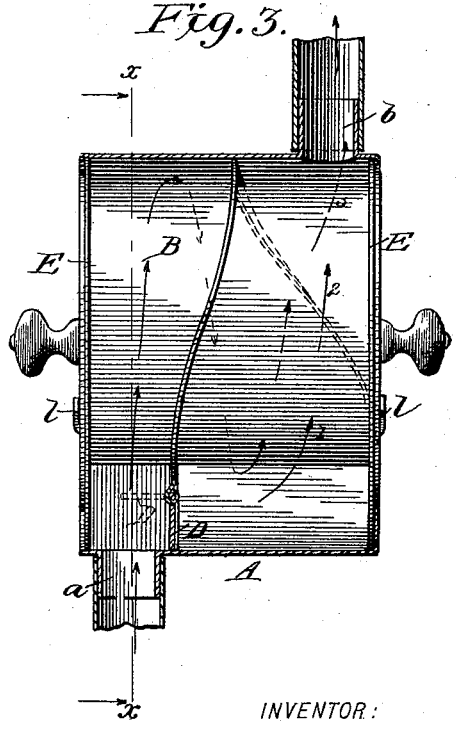
WITNESSES:
Fred G. Dieterich
Edw. W. Byrn
INVENTOR:
Genisa Ott.
BY Munn & Co
ATTORNEYS
THE NORRIS PETERS CO., PHOTO-LITHO., WASHINGTON, D. C.

UNITED STATES PATENT OFFICE.

GENISA OTT, OF SCOTIA, NEBRASKA.

HEATING-DRUM.

SPECIFICATION forming part of Letters Patent No. 431,782, dated July 8, 1890.

Application filed January 30, 1890. Serial No. 338,690. (No model.)

*To all whom it may concern:*

Be it known that I, GENISA OTT, of Scotia, in the county of Greeley and State of Nebraska, have invented a new and useful Improvement in Heating-Drums, of which the following is a specification.

My invention is in the nature of a device to be applied to the smoke-pipe of an ordinary stove to utilize the heat for the purpose of heating sad-irons, for baking, cooking, drying fruit, or for warming a room.

It relates to that form of heating-drum in which a horizontal cylindrical casing is provided with an inner casing forming an oven, between which inner and outer casing are arranged deflecting-plates which cause the smoke and hot-air currents to circulate around the same to heat the oven within, a damper being arranged between the two casings to cause the hot currents to pass through the drum by a long or short route.

My improvement consists in the peculiar construction and arrangement of the inner and outer casing, the deflecting-plates, and damper, as will be hereinafter fully described.

Figure 1 is a front elevation; Fig. 2, a vertical transverse section, and Fig. 3 a vertical longitudinal section.

A represents the outer casing, and B the inner casing, of the drum, connected together by annular heads H. Each of these casings is bent around into cylindrical form with one side flattened, the flat side of the outer casing being at the top and the flat side of the inner casing being at the bottom. The object of this is to give a flat floor to the oven to place sad-irons, pans, or dishes upon, and the flat top of the outer casing is for the same purpose. At the bottom of the outer casing at one end is a thimble *a* for connection with the smoke-pipe leading from the stove, and at the top of the outer casing at the other end is a thimble *b* for connection with stove-pipe leading to the chimney. The thimble *a* forms the inlet for the smoke and hot gases, and the thimble *b* the outlet. Between the two casings the hot currents are made to circulate with a winding passage to thoroughly heat the oven by means of a spiral flange C. This flange has near the inlet a damper D, by which the hot currents are made to travel a longer or shorter course about the oven. When the damper is closed, the hot currents travel in the direction of the arrows, making one complete revolution and a half of a revolution about the oven before they escape at the exit *b*. When the damper is opened, as in dotted lines, the hot currents take the shorter course, passing only half-way around the oven and then out, as shown by the arrows 1, 2, and 3. By this means a greater or less heat may be maintained in the oven.

At each end of the door is arranged a removable door, consisting of a metal disk E with a central knob. This disk is held to place by two overlapping lugs *l l*, which are placed a short distance above the bottom of the oven, and the disk-shaped door is dropped into place from above and slides down inside the lugs and lapping on the outside of the flattened bottom of the oven, so as to prevent the door from tilting outwardly.

I do not confine myself to the special form of door shown, however, as the other features of my invention may be used with hinged doors.

For heating the room both doors are opened and the air allowed to circulate freely through the oven.

Having thus described my invention, what I claim as new is—

1. A heating-drum consisting of outer cylindrical casing A, flattened at the top and having inlet-pipe *a* and outlet-pipe *b*, inner cylindrical casing B, flattened at the bottom, and the spiral flange C, arranged between the two and having a damper D, arranged transversely to the axial center of the oven and located in the portion of the flange beneath the flattened bottom of the inner chamber H, substantially as shown and described.

2. The combination, in a heating-drum, of an inner chamber B, having a flattened bottom, head H, having offset lugs *l l* just above the bottom of the inner chamber and below the middle horizontal line, and the disk-door E, arranged to be seated in lugs *l l* and to be held between the same and the edge of the inner cylinder, substantially as shown and described.

GENISA OTT.

Witnesses:
J. T. PRICE,
F. FISHER.